(12) United States Patent
Martí Sala

(10) Patent No.: US 8,051,971 B2
(45) Date of Patent: Nov. 8, 2011

(54) APPARATUS AND METHOD FOR POSITIONING ARTICLES, COMPRISING MULTIPLE UNLOADING OPERATIONS PER CYCLE

(76) Inventor: Jaime Martí Sala, Barcelona (ES)

( * ) Notice: Subject to any disclaimer, the term of this patent is extended or adjusted under 35 U.S.C. 154(b) by 656 days.

(21) Appl. No.: 11/630,492

(22) PCT Filed: Jun. 14, 2005

(86) PCT No.: PCT/ES2005/000335
§ 371 (c)(1),
(2), (4) Date: Oct. 21, 2008

(87) PCT Pub. No.: WO2006/010779
PCT Pub. Date: Feb. 2, 2006

(65) Prior Publication Data
US 2009/0120765 A1      May 14, 2009

(30) Foreign Application Priority Data
Jun. 24, 2004   (ES) .................................. 200401542

(51) Int. Cl.
*B65G 29/00* (2006.01)
(52) U.S. Cl. ..................... 198/392; 198/397.05; 198/450
(58) Field of Classification Search .................. 198/392, 198/396, 397.02, 397.05, 450
See application file for complete search history.

(56) References Cited

U.S. PATENT DOCUMENTS

| 3,295,659 A | 1/1967 | Aidlin | |
|---|---|---|---|
| 3,662,872 A | 5/1972 | Nalbach | |
| 4,130,194 A * | 12/1978 | Schindel et al. | 198/397.02 |
| 4,681,209 A * | 7/1987 | Marti | 198/392 |
| 4,825,995 A * | 5/1989 | Nalbach | 198/380 |
| 4,979,607 A | 12/1990 | Fogg | |
| 5,065,852 A * | 11/1991 | Marti | 198/392 |
| 5,158,168 A | 10/1992 | Bedin | |
| 5,415,322 A * | 5/1995 | Sala | 221/169 |
| 5,542,233 A | 8/1996 | Graffin | |
| 5,826,696 A * | 10/1998 | Rupp et al. | 198/392 |
| 5,984,079 A * | 11/1999 | Garcia | 198/397.02 |

(Continued)

FOREIGN PATENT DOCUMENTS
EP          0 711 717 A1     5/1996
(Continued)

OTHER PUBLICATIONS
International Search Report for PCT International Application PCT/ES 2005/000335 mailed Sep. 22, 2005.

*Primary Examiner* — Joseph A Dillon, Jr.
(74) *Attorney, Agent, or Firm* — RatnerPrestia

(57) ABSTRACT

The invention relates to an apparatus and method for positioning articles, comprising multiple unloading operations per cycle. The inventive apparatus comprises means for placing articles in housings that move along the length of a closed circuit provided with at least first and second drop sites through which the correctly oriented articles fall from each housing into a corresponding alignment conduit placed under and moving together with each housing. In addition compartments are positioned between the alignment conduits. According to the invention, transfer means transfer each article from a conduit to a compartment after said article has fallen through the first drop site, but before it has reached the second drop site. Subsequently, extraction means extract the correctly oriented and aligned articles from said conduits and compartments and transfer same to an outfeed conveyor.

12 Claims, 6 Drawing Sheets

U.S. PATENT DOCUMENTS

| | | | | |
|---|---|---|---|---|
| 6,098,781 | A * | 8/2000 | Lanfranchi | 198/400 |
| 6,318,540 | B1 * | 11/2001 | Spatafora | 198/396 |
| 6,435,334 | B1 * | 8/2002 | Spatafora | 198/445 |
| 6,446,781 | B1 | 9/2002 | DeVillele | |
| 6,557,691 | B2 * | 5/2003 | Ronchi | 198/400 |
| 6,966,422 | B2 * | 11/2005 | Lanfranchi | 198/396 |
| 7,117,987 | B2 * | 10/2006 | Nalbach | 198/393 |
| 7,134,540 | B1 * | 11/2006 | Marti Sala | 198/392 |
| 7,270,229 | B2 * | 9/2007 | Perazzo et al. | 198/550.4 |
| 7,472,782 | B2 * | 1/2009 | Corbin | 198/392 |
| 7,704,033 | B2 * | 4/2010 | Garcia et al. | 414/416.04 |
| 7,950,517 | B2 * | 5/2011 | Marti Sala et al. | 198/392 |
| 7,987,968 | B2 * | 8/2011 | Kobayashi et al. | 198/689.1 |

FOREIGN PATENT DOCUMENTS

| | | |
|---|---|---|
| EP | 0 945 374 A1 | 9/1999 |
| ES | 2 132 045 | 8/1999 |

* cited by examiner

US 8,051,971 B2

APPARATUS AND METHOD FOR POSITIONING ARTICLES, COMPRISING MULTIPLE UNLOADING OPERATIONS PER CYCLE

This application is a U.S. National Phase Application of PCT International Application No. PCT/ES2005/000335 filed Jun. 14, 2005.

TECHNICAL FIELD

The present invention generally relates to an apparatus and method for positioning articles, comprising multiple unloading operations per cycle, and more specifically to a rotating apparatus for positioning empty plastic containers, comprising multiple unloading operations per turn, and to a method suitable for being implemented by means of said apparatus.

BACKGROUND OF THE INVENTION

In several industrial sectors, machines are used for positioning initially randomly arranged articles into a predetermined position and/or into an aligned arrangement. More specifically, in the packaging field, machines are used to put empty bottles or containers upright and align them. A type of positioning machine is known that is suitable for putting in the upright position containers of the type defining a longitudinal body with a base at one of its ends and an opening for filling the container on the other end, such that they rest on their base and with said opening for filling the container in an upper part thereof. The opening for filling the container generally forms a neck constituting a geometric shape that is different at the end opposite to the base.

Patent document U.S. Pat. No. 3,295,659 describes a machine based on an operating principle which has become the most widely used in many types of article positioning machines. Such principle is based on the handling of the mentioned different geometric shape to put the articles upright and comprises first individually arranging the articles in a housing in a horizontal position and with the longitudinal axis of the article pre-oriented according to the direction of said housing, such that the different geometric shape is facing either end of the housing, and then allowing the article to fall due to gravity through an open bottom of the housing into an alignment conduit. There are abutment and support configurations in the house intended for supporting said different geometric shape whatever its relative position is with respect to the housing so that the article always drops on its base into the alignment conduit. The machine adopts a rotary configuration in which a plurality of said cavities intended for receiving an article are radially arranged on the periphery of a circular structure.

Other more recent rotary positioning machines are known which are intended for empty lightweight bottles or containers, comprising a series of housings attached to a rotating structure, arranged tangentially on the periphery thereof, around a container receiving the articles in a random arrangement and means for leading in each housing a container or bottle in a horizontal position, with its longitudinal axis pre-oriented according to the tangential direction of the housing and with the neck either in the front part or in the rear part with respect to the rotation direction. Each of the mentioned housings has an open bottom over an alignment conduit which moves together with it and means are provided for allowing a container to drop upright from each housing into its corresponding alignment conduit through a drop site in the course of each turn. Deflector means for finally transferring the vertically oriented containers from the alignment conduits to an outfeed conveyor.

Given that a container in the horizontal position occupies a portion of the perimeter of the container that is greater than an upright container, it is possible to arrange along the length of the lower part of the perimeter of the container more compartments for upright containers than housings for horizontal containers in the upper part. This means that each housing can discharge upright containers in more than one compartment in the course of each turn.

Patent document U.S. Pat. No. 3,662,872 discloses a positioning machine with two drop sites per turn, in which each alignment conduit is vertically divided into two equal compartments by a wall and a divider plate is arranged in a hinged manner at an upper end of said wall and actuated by actuation means to alternately change position for the purpose of directing the articles which drop from the housing into either of said compartments in the course of each turn. The machine is therefore able to discharge from each peripheral housing, and through the two drop sites, two articles in each alignment conduit in the course of a turn.

Patent document EP-A-0945374 describes a rotating machine for orienting containers, particularly empty plastic bottles, provided with multiple drop sites per turn. This machine comprises a central hopper and a rotary structure on the periphery of which there are a plurality of housings. Each peripheral housing is associated with a corresponding alignment conduit located below it and which moves together with the conduit. Located under the alignment conduits there are a series of compartments provided with rollers for rolling over a peripheral track and linked to a drive chain which moves them in the same direction in which the structure rotates. Each drop conduit has as many corresponding lower compartments as drop sites in the circumference of the machine and the mentioned peripheral track on which the compartments move define a sinusoidal shape in relation to each drop site elongating the trajectory enough to misalign the position of a compartment with respect to the corresponding alignment conduit before passing through each drop site. A support plane is arranged between the drop conduits and the compartments having cutouts so as to allow the passage of the containers when a drop conduit is aligned with an empty compartment.

This system, however, is excessively complex given that each compartment must be constituted by way of a small carriage to be driven and led over a peripheral sinusoidal track provided with support rollers for rolling over a horizontal portion of the track for the purpose of counteracting the forces due to gravity, and other support rollers for rolling over a vertical portion of the track to counteract the forces due to traction of the drive chain, this vertical portion of the track being what defines the sinusoidal shapes. It must be taken into consideration that for example in a normal sized machine with 28 housings along its circumference and three drop sites, 84 rolling compartments linked to the drive chain would be necessary, which means a high manufacturing cost, excessive assembly complexity and low operating reliability.

One aspect of the present invention is to provide an apparatus and method for positioning articles, based on the known principle of articles falling from housings into alignment conduits, comprising multiple unloading operations per cycle, which is able to position multiple articles by means of each housing in the course of each cycle using a relatively simple, economical and reliable mechanism.

DISCLOSURE OF THE INVENTION

The present invention contributes in attaining the foregoing and other aspects by providing, according to a first aspect, an apparatus for positioning articles, comprising multiple unloading operations per cycle, of the type comprising means for placing articles in a plurality of individual housings that move along the length of a closed circuit provided with at least first and second drop sites, through which the correctly oriented articles fall from each housing into a corresponding alignment conduit placed under and moving together with each housing, and extraction means for extracting the correctly oriented and aligned articles from said alignment conduits to an outfeed conveyor. The apparatus is characterized in that it comprises a plurality of compartments positioned between the alignment conduits, and transfer means for transferring each article from its corresponding alignment conduit to one of said compartments after said particular article has been received in the corresponding alignment conduit through said first drop site and before said alignment conduit receives a new article through said second drop site.

The transfer means comprise an outfeed deflector arranged for transferring the articles from their corresponding alignment conduits, which are arranged in said closed circuit, to a translation device adopted for transferring the articles along the length of an alternative circuit, and an infeed deflector arranged for transferring the articles from said translation device to their corresponding compartments located in the closed circuit.

According to a second aspect, the present invention provides a method for positioning articles, comprising multiple unloading operations per cycle, of the type comprising the steps of placing the articles in a plurality of individual housings that move along the length of a closed circuit provided with at least first and second drop sites, the correctly oriented articles falling through said first and second drop sites from each housing into a corresponding alignment conduit placed under and moving together with each housing, and extracting the correctly oriented and aligned articles from said alignment conduits to an outfeed conveyor. The method is characterized in that it comprises providing a plurality of compartments positioned between the alignment conduits, and the additional step of transferring each article from its corresponding alignment conduit to one of said compartments after said particular article has been received in the corresponding alignment conduit through said first drop site and before this particular alignment conduit receives a new article through said second drop site.

The mentioned additional step of transferring each article from its corresponding alignment conduit to one of the compartments comprises deflecting the articles by means of an outfeed deflector from their corresponding alignment conduits to a translation device, transferring the articles by means of said translation device along the length of an alternative circuit, and transferring the articles by means of an infeed deflector from said translation device to their corresponding compartments.

Obviously the length of the mentioned alternative circuit is selected so as to misalign the position of the article from an alignment conduit to one of the compartments, the receiving compartment not having to be contiguous to the alignment conduit.

In an apparatus with only two drop sites, there is the same number of compartments as alignment conduits, and they are alternately arranged along the circumference of the rotary structure. In the event that the apparatus includes more than two drop sites along its circumference, the number of compartments positioned between every two alignment conduits is equal to the number of drop sites minus one. In other words, for each housing there is one alignment conduit and one or more compartments which together add up to the number of drop sites. It must be taken into consideration however that the number of compartments added to the alignment conduit associated to each housing is limited by the height and width ratio of the articles to be positioned, and this determines the number of drop sites of the apparatus. Usually, though not be limited to it, the number of drop sites does not exceed four.

In an apparatus with more than two drop sites, there is one of said translation devices for transferring the articles along the length of an alternative circuit for each drop site exceeding the first one. Therefore, for example, in an apparatus with three drop sites, there are two compartments positioned between every two alignment conduits and two translation devices, one between the first drop site and the second drop site, and the other one between the second drop site and the third drop site. The first translation device transfers the article loaded in a particular alignment conduit through the first drop site to one of the two compartments, leaving the alignment conduit empty. The second translation device transfers the article loaded in this particular alignment conduit through the second drop site to the other one of the two compartments, again leaving the alignment conduit empty. Finally, another article is loaded in the particular alignment conduit through the third drop site. Therefore, in one part of the closed circuit extending from the third drop site to an extraction device connected to the mentioned outfeed conveyor, all the compartments and all the alignment conduits are filled with respective upright and aligned articles, arranged for their extraction.

The translation device can adopt different shapes. According to one embodiment, the translation device comprises an odd number of transfer wheels, provided with divisions along their perimeter and tangentially connected consecutively for continuously taking the articles from the alignment conduits arranged in the closed circuit, transferring the articles from the mentioned divisions of each of the transfer wheels to the divisions of the next one along the alternative circuit, and again introducing the articles in the closed circuit, but now in the compartments. To that end, the transfer wheels are kinematically linked to one another and with a moving structure on which the housings, the alignment conduits and the compartments are assembled, such that the divisions of the outfeed and infeed transfer wheels are respectively in phase with the alignment conduits and the compartments.

According to another embodiment, the apparatus comprises at least one stationary support element dividing each of the alignment conduits into an upper section and a lower section along a part of said closed circuit including an area corresponding to said first drop site and not including an area corresponding to said second drop site. The compartments are arranged at the level of said lower sections of the alignment conduits. Here, the translation device comprises a rotary transfer wheel comprising divisions on its periphery, and at least one stationary support element dividing each of said divisions into an upper section and a lower section along a part of its rotation cycle. The transfer wheel is arranged to receive in said upper sections of its divisions the articles deflected by the outfeed deflector from said upper sections of the alignment conduits, the articles falling from the upper sections to said lower sections of the divisions through a cutout of the mentioned stationary support element, and delivering the articles from the lower sections of the divisions to the compartments by means of the infeed deflector. The upper sections and the lower sections of the divisions are not in phase with one another, and the lower sections include means for deflecting the articles during their drop for the purpose of phase changing them. The transfer wheel is kinematically linked to the moving structure on which the housings, the alignment conduits and the compartments are assembled, such that the upper sections of the divisions are in phase with the alignment conduits and the lower sections of the divisions are in phase with the compartments.

The mentioned kinematic linkage between the rotary structure of the apparatus and the transfer wheel or wheels is easily achieved by means of one or more gear, chain or cog belt transmissions, which precisely determine the relative positions of the different elements in a simple, economical and reliable manner. An equivalent result can be achieved by actuating each element or group of elements with an independent servomotor and electronically controlling all the servomotors for a kinematic coordination.

BRIEF DESCRIPTION OF THE DRAWINGS

The foregoing and other advantages and features of the present invention will be better understood from the following detailed description of embodiments in reference to the attached drawings, in which.

DETAILED DESCRIPTION OF EXEMPLARY EMBODIMENTS

Figure 1:
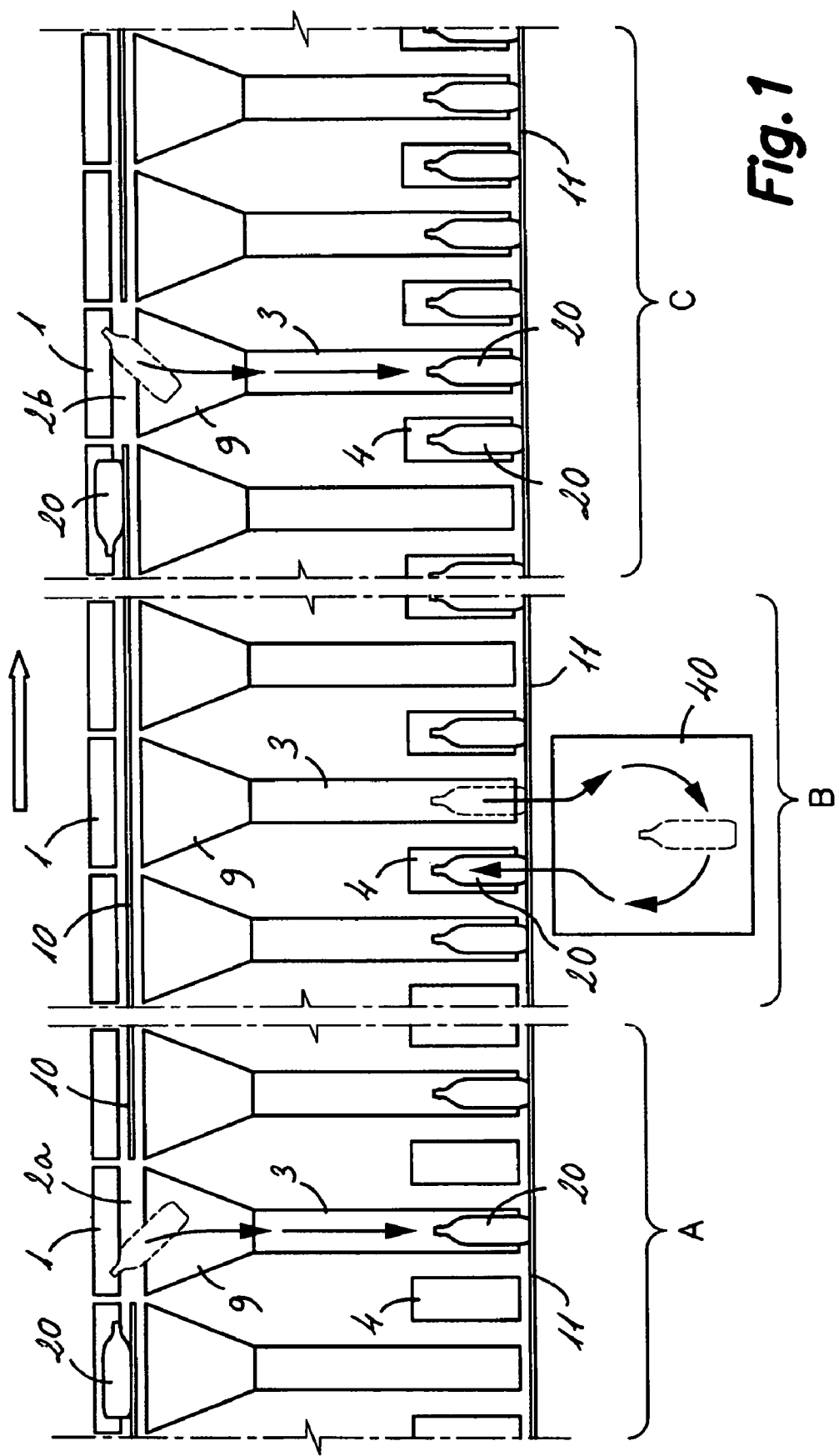
FIG. 1 is a schematic diagram representing a linear development of an apparatus with a cyclical arrangement of housings, alignment conduits and compartments according to one embodiment of the present invention, including areas A, B, C showing different steps in the course of a cycle according to one embodiment of the method of the present invention.

First in reference to FIG. 1, a diagram is shown representing the linear development of a cyclical configuration of an apparatus for positioning articles, comprising multiple unloading operations per cycle, according to one embodiment of the present invention. This configuration is suitable for implementing an embodiment of the method of the present invention.

Thus, the apparatus of FIG. 1 comprises means for placing articles 20 in a plurality of individual housings 1 that move along the length of a closed circuit. In view of FIG. 2, this closed circuit is circular and is determined by a moving structure 7, rotating about an axis 8, along the upper perimeter of which the housings 1 (shown in partial detail in FIG. 2) are assembled. The housings 1 have a longitudinal dimension that is tangentially oriented with respect to the circular periphery of said moving structure 7. The central part of the moving structure 7 is useful for positioning a container 12 suitable for initially receiving articles in bulk in a random manner. The apparatus includes means for individually loading an article 20 from said container 12 into each housing 1. These means can be according to any one of the systems well known in the state of the art and are not the subject of the present invention.

Returning to FIG. 1, the housings 1 have an open bottom and arranged below each housing 1 there is arranged an alignment conduit 3 generally having an upper funnel-shaped portion 9. A first stationary support plane 10 is located between the open bottoms of the housings 1 and the funnel-shaped portions 9 of the alignment conduits 3, which plane has two cutouts forming two drop sites 2a and 2b located in different sections of the rotation trajectory of the structure 7. The articles 20 housed in the housings 1 are slid over said first stationary support plane 10 until they fall due to gravity through said drop sites 2a and 2b into the corresponding alignment conduit 3. In certain areas of the housings 1, as is conventional, there are abutments and/or supports arranged to support a different shape of the article 20 when it falls into the alignment conduit 3, such that the article 20 is always in the vertical position inside the alignment conduit 3 with a desired orientation. A suitable article to be handled by the apparatus of the present invention is, for example, an empty plastic container, in which case the mentioned different shape may be a neck of said container. Therefore, the containers are upright on their base in the alignment conduits 3, with an opening adjacent to the mentioned neck in the upper part.

If the moving structure 7 moves or rotates, for example, in the direction indicated by the arrow shown at the top of FIG. 1, the housings 1 first pass through the first drop site 2a, through which the article 20 of each housing 1 falls into the corresponding alignment conduit 3, as shown in area A of FIG. 1. From this point on, all the alignment conduits 3 are occupied by respective upright articles 20 which are slid over a second stationary support plane 11, whereas the compartments 4 remain empty. The housings 1 which are empty will be occupied again by articles 20 which will fall through the second drop site 2b in the course of this same turn. It is evident that this makes it necessary to empty the alignment conduits 3 before filling them again with articles 20 which will fall through the second drop site 2b.

To that end, the apparatus of the present invention comprises a plurality of compartments 4 positioned between the alignment conduits 3 and fixed to the moving structure 7, such that they move together with the housings 1 and alignment conduits 3. The apparatus further includes transfer means 40 (symbolically indicated by means of a box in area B of FIG. 1) adapted for transferring each article 20 from its corresponding alignment conduit 3 to one of said compartments 4, as indicated by means of arrows in area B of FIG. 1. These transfer means 40 are located at a point of the rotation trajectory of the structure 7 after an article 20 has been received in a particular alignment conduit 3 through the first drop site 2a and before the particular alignment conduit 3 receives a new article 20 through said second drop site 2b. The articles 20 traveling in the alignment conduits 3 are thus transferred to the compartments 4, and the alignment conduits 3 are empty again when reaching the area of the second drop site 2b, shown in area C of FIG. 1. The articles 20 that move in the housings 1 fall upright through the second drop site 2b into the alignment conduits 3, and from this point on, both the compartments 4 and the alignment conduits 3 are occupied by upright articles 20 which are slid over said second stationary support plane 11 until they are extracted from the apparatus by known extraction means 30, for example, in the form of a transfer wheel adapted for extracting the correctly oriented and aligned articles 20 from said alignment conduits 3 and compartments 4 to an outfeed conveyor 31, as shown in FIG. 2.

It is understood that it is not necessary for the transfer means 40 to transfer the article 20 from an alignment conduit 3 to an adjacent compartment 4 (as shown in FIG. 1), but rather that the article 20 can be reintroduced in the closed circuit in a compartment 4 located several sites upstream or downstream from the alignment conduit 3 from which it has been extracted. In the event that a number of additional drop sites have been added along the length of the closed circuit, the compartments positioned between every two alignment conduits will be increased by the same number and as many other units of transfer means 40 will be installed, one before each additional drop site.

Figure 2:
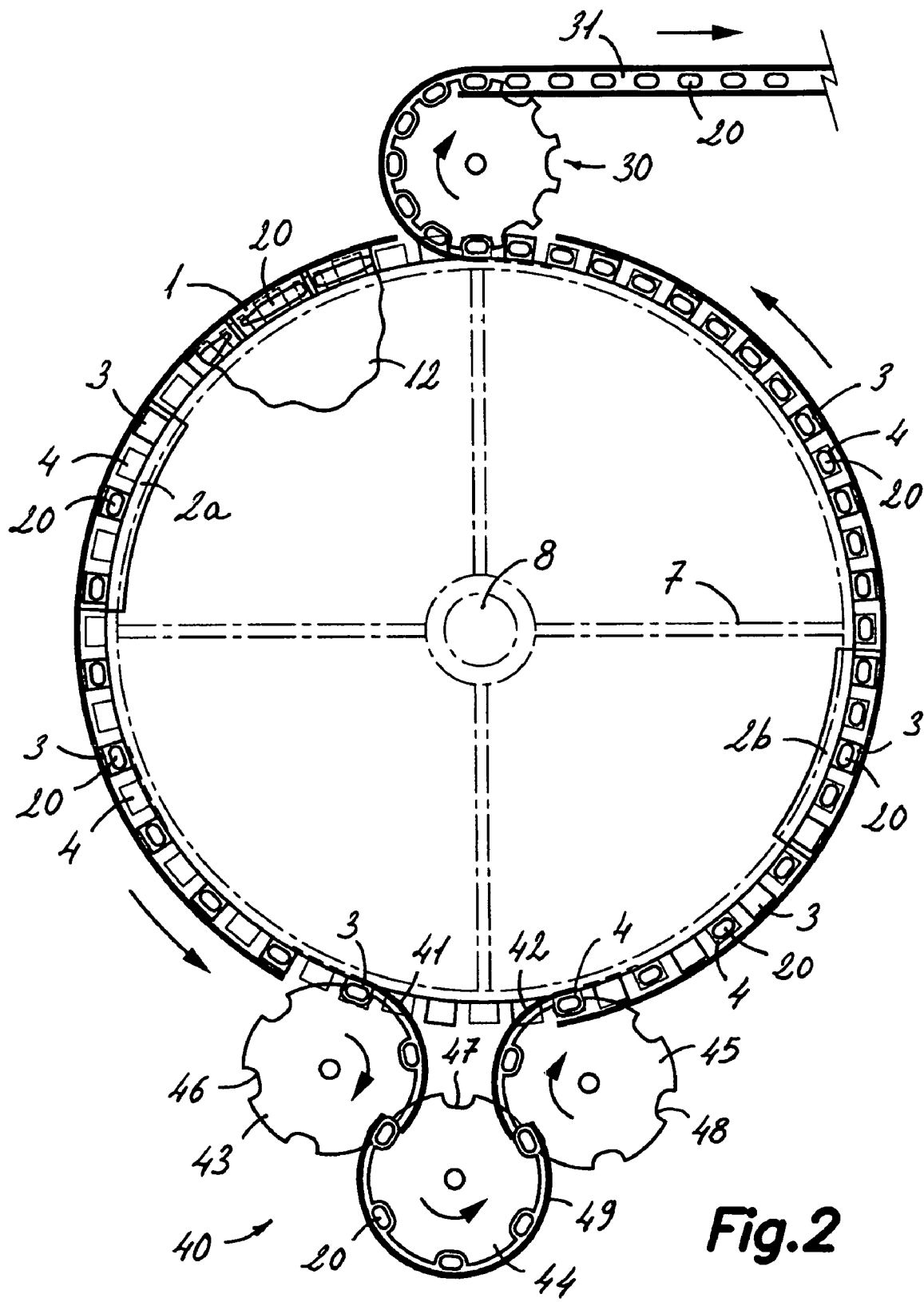
FIG. 2 is a schematic plan view of an apparatus with a circular arrangement and a translation device according to the embodiment of FIG. 1.

In relation to FIG. 2, a specific embodiment is described for the mentioned transfer means 40, which is suitable for the construction shown in FIG. 1. Thus, the transfer means 40 comprise an outfeed deflector 41 arranged for transferring the articles 20 from their corresponding alignment conduits 3 to a translation device adopted for transferring the articles 20 along the length of an alternative circuit, and an infeed deflector 42, arranged for transferring the articles 20 from said translation device to their corresponding compartments 4. The translation device shown in FIG. 2 comprises a outfeed transfer wheel 43, an intermediate transfer wheel 44 and an infeed transfer wheel 45, which include divisions 46, 47, 48 along their respective peripheries that are suitable for receiving and pushing the articles 20. The mentioned divisions 46, 47, 48 in each of the transfer wheels 43, 44, 45, are spaced from one another according to the distances existing between the alignment conduits 3 or the compartments 4 in the moving structure 7, i.e. they have the same "pitch". The mentioned outfeed transfer wheel 43 is rotatably arranged to receive in its divisions 46 the articles 20 deflected by said outfeed deflector 41 from the alignment conduits 3. The intermediate transfer wheel 44 is rotatably arranged to receive in its divisions 47 articles 20 from the divisions 46 of the outfeed transfer wheel 43 and to deliver articles 20 from its divisions 47 to the divisions 48 of the infeed transfer wheel 45. Finally, the infeed transfer wheel 45 is rotatably arranged to deliver the articles 20 from its divisions 48 to the compartments 4 by means of said infeed deflector 42.

The outfeed and infeed deflectors 41, 42 also act as guides for the trajectory of the articles 20 when they are conveyed by the corresponding outfeed and infeed transfer wheels 43, 45, and a railing 49 is used as a guide for the trajectory of the articles 20 when they are conveyed by the transfer wheel 44. The articles 20 can be slid over a stationary support surface, not shown, along the length of the alternative circuit defined by the outfeed, intermediate and infeed transfer wheels 43, 44, 45.

As indicated by means of arrows in FIG. 2, the outfeed and infeed transfer wheels 43, 45 rotate in a direction opposite to the rotation direction of the moving structure 7, and the intermediate transfer wheel 44 rotates in a reverse direction with respect to the outfeed and infeed transfer wheels 43, 45. The transfer wheels 43, 44, 45 are tangentially coupled consecutively for transferring the articles 20 between them along the length of said alternative circuit, which has a suitable length for phase changing the position of the divisions 46 of the outfeed transfer wheel 43 with respect to the position of the divisions 48 of the infeed transfer wheel 45. In other words, the divisions 46 of the outfeed transfer wheel 43 coincide with the alignment conduits 3 in the moving structure 7, whereas the divisions 48 of the infeed transfer wheel 45 coincide with the compartments 4 in the moving structure 7.

Although a single intermediate transfer wheel 44 is shown in the embodiment shown in FIG. 2, a person skilled in the art will understand that any odd number of rotating intermediate transfer wheels provided with respective divisions on its periphery can be included, said intermediate transfer wheels being tangentially connected to one another for transferring the articles 20 from the mentioned divisions of each one to the divisions of the next one.

In any case, the outfeed transfer wheel 43, the intermediate transfer wheel or wheels 44, and the infeed transfer wheel 45 are kinematically linked to one another and to the moving structure 7 on which the housings 1, the alignment conduits 3 and the compartments 4 are assembled, such that the divisions 46 and 48 of the outfeed and infeed transfer wheels 43, 45 are respectively in phase with the alignment conduits 3 and the compartments 4.

Figure 5:
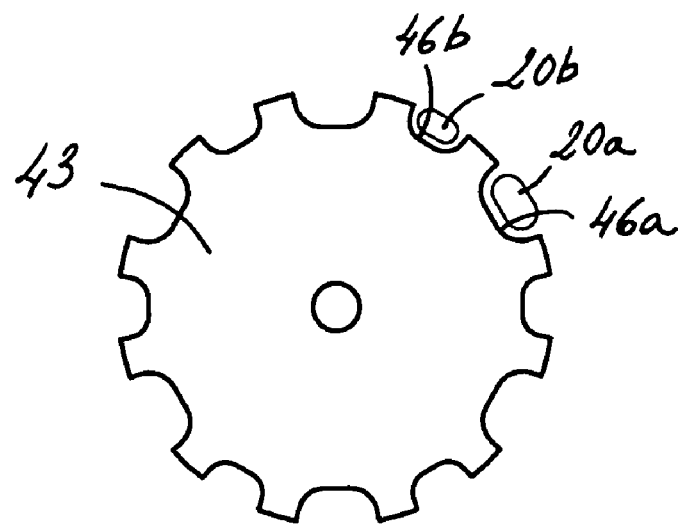
FIG. 5 is a schematic plan view of a transfer wheel of the translation device of FIG. 2.

According to a variant of this embodiment not shown, at least the housings 1, the alignment conduits 3 and the compartments 4 are equipped with adaptation means for adapting them to different sized articles 20. In such case, each of said transfer wheels (as shown by way of example by means of the outfeed transfer wheel 43 shown in FIG. 5) comprises on its periphery a series of first divisions 46a suitable for articles 20a of a first size, and a series of second divisions 46b suitable for articles 20b of a second size, said second divisions of 46b being positioned between the first ones. The translation device includes adjustment means for adjusting the angular positions of the transfer wheels 43, 44, 45 for the purpose of selectively placing the first or second divisions 46a, 46b of the outfeed and infeed transfer wheels 43, 45 respectively in phase with the alignment conduits 3 and the compartments 4.

Figure 3:
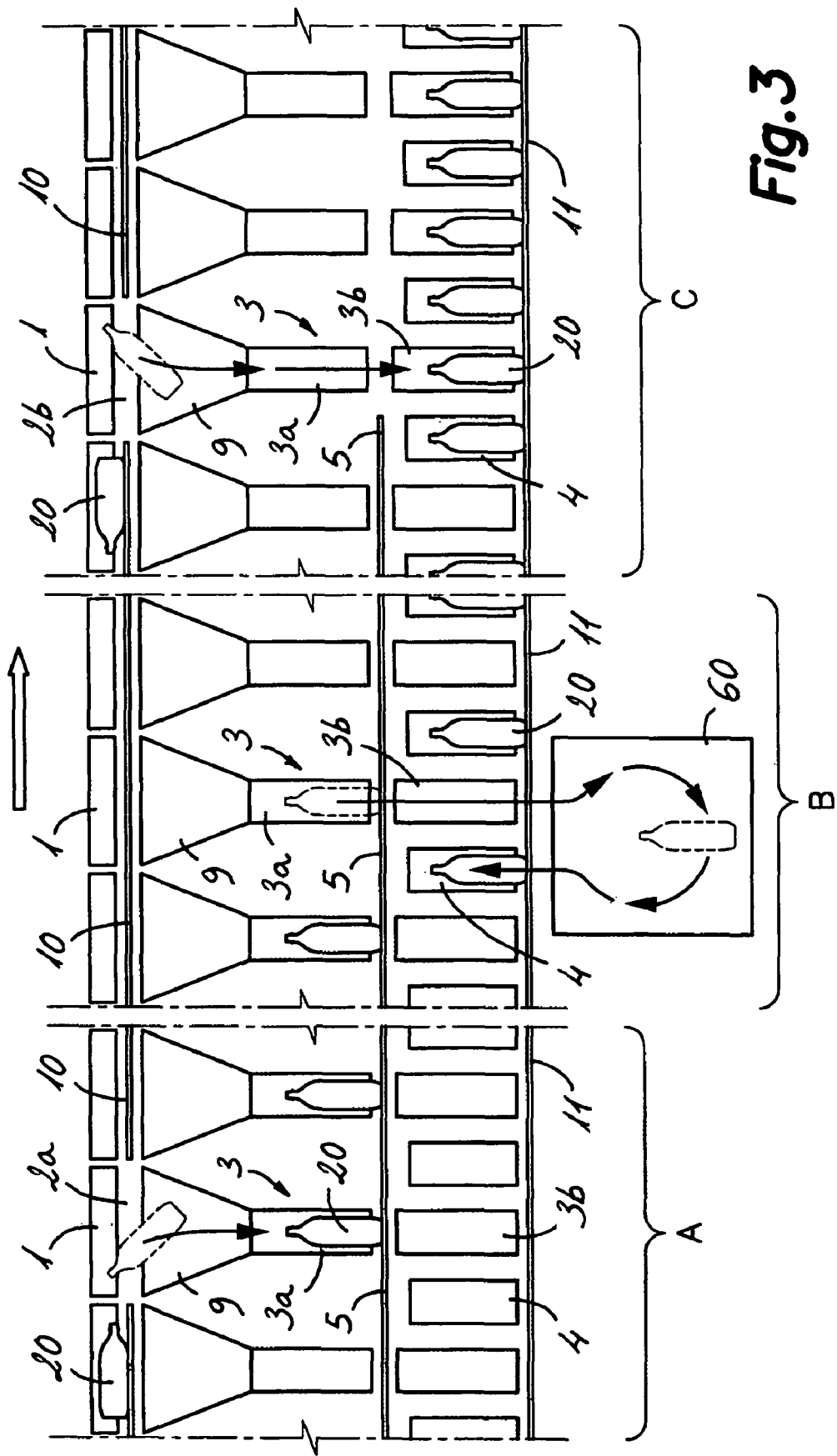
FIG. 3 is a schematic diagram representing a linear development of an apparatus with a cyclical arrangement of housings, alignment conduits and compartments according to another embodiment of the present invention, including areas A, B, C showing different steps in the course of a cycle according to another embodiment of the method of the present invention.

Now in reference to FIG. 3, it shows a diagram representing the linear development of a cyclical configuration of an apparatus for positioning articles, comprising multiple unloading operations per cycle, according to another embodiment of the present invention. The diagram differs from the one shown in FIG. 1 in that in this case, the apparatus comprises at least one stationary support element 5 dividing each of the alignment conduits 3 into an upper section 3a and a lower section 3b along a part of said closed circuit. The incorporation of the mentioned stationary support element 5 is well known in the state of the art. However, in this case the part of the closed circuit in which the stationary support element 5 is present includes an area corresponding to said first drop site 2a (area A of FIG. 3) and does not include an area corresponding to said second drop site 2b (area C of FIG. 3). As can be seen, the compartments 4 are arranged at the level of the lower sections 3b of the alignment conduits 3.

As is shown in area A of FIG. 3, the housings 1 first pass through the first drop site 2a, through which the article 20 of each housing 1 falls into the corresponding upper section 3a of the alignment conduit 3 and continues traveling inside the upper section 3a of the alignment conduit 3 sliding over the stationary support element 5. In other words, from the first drop site 2a on, the upper sections 3a of all the alignment conduits 3 are occupied by an article 20 and both the lower sections 3b of the alignment conduits 3 and the compartments 4 are empty, until they reach the area where the transfer means are located.

In this embodiment, the apparatus includes transfer means 60 (symbolically indicated by means of a box in area B of FIG. 3) adapted for transferring each article 20 from its corresponding upper section 3a of the alignment conduit 3 to one of the compartments 4, as indicated by means of arrows in area B of FIG. 3. As can be seen in FIG. 3, after this operation carried out by the transfer means 60, all the compartments 4 are occupied by articles 20, whereas all the upper and lower sections 3a, 3b of the alignment conduit 3 are unoccupied. Before reaching the second drop site 2b (area C of FIG. 3), the stationary support element 5 disappears and the articles 20 falling through the second drop site 2b directly access the lower section 3b of the alignment conduit 3. Therefore, from this point on the lower sections 3b of all the alignment conduits 3 and all the compartments 4 are occupied by upright articles 20 which are moved by sliding them over said second stationary support plane 11 until they are extracted from the apparatus by extraction means 30.

Figure 4:
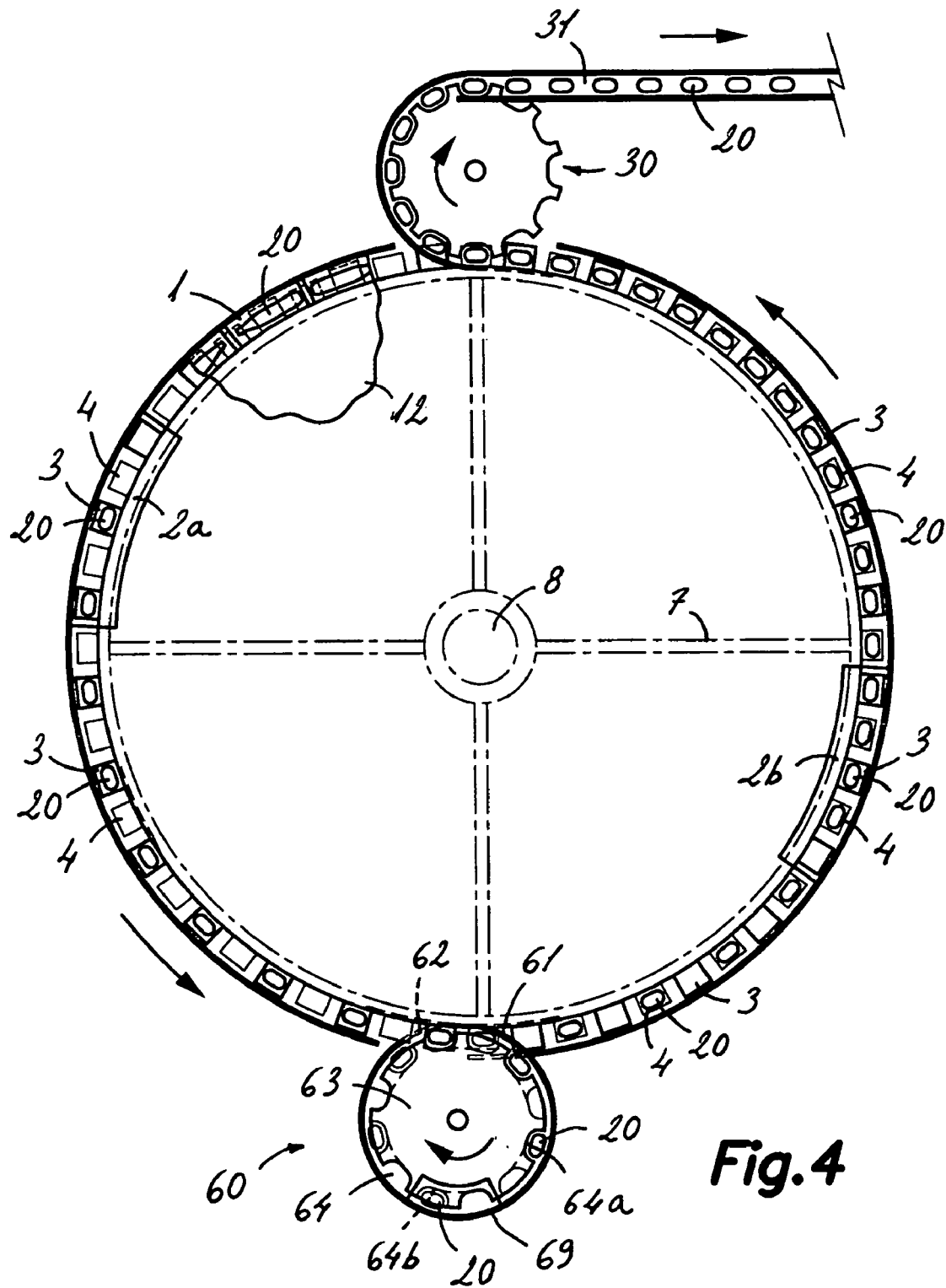
FIG. 4 is a schematic plan view of an apparatus with a circular arrangement and a translation device according to the embodiment of FIG. 3.

In relation to FIG. 4, a specific embodiment is described for the mentioned transfer means 60 suitable for the construction shown in FIG. 3. In this embodiment, the apparatus includes a moving structure 7 on which the housings 1, alignment conduits 3, compartments 4, and other elements of a rotating positioning machine similar to the one described above in relation to FIG. 2 are housed.

Figure 6:
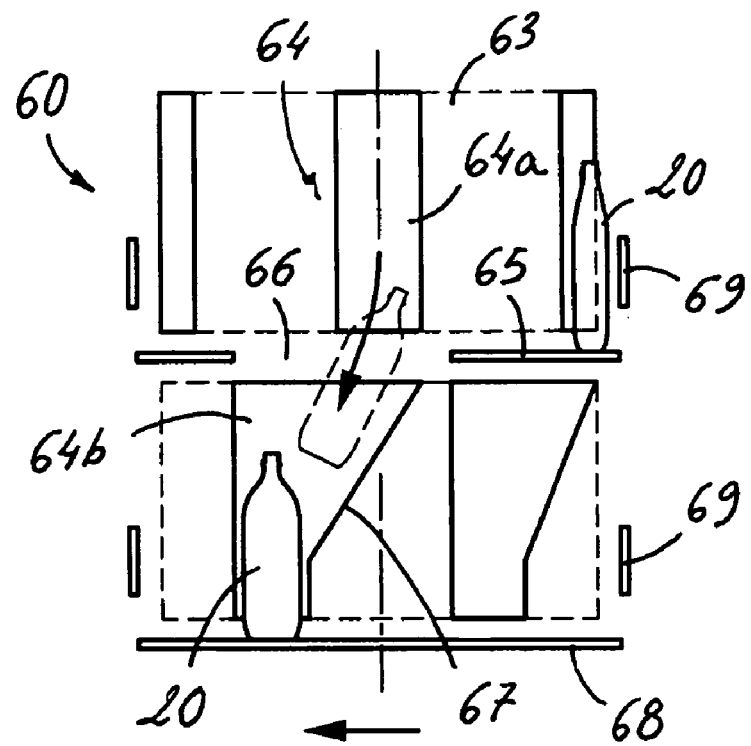
FIG. 6 is a schematic side elevational view of a transfer wheel of the translation device of FIG. 4.

In a manner similar to the transfer means 40 described in relation to FIG. 2, here the transfer means 60 comprise an outfeed deflector 61 arranged for transferring the articles 20 from their corresponding upper sections 3a of the alignment conduits 3 to a translation device adopted for transferring the articles 20 along the length of an alternative circuit, and an infeed deflector 62 arranged for transferring the articles 20 from said translation device to their corresponding compartments 4. However, said translation device in this case comprises a single rotating transfer wheel 63 comprising divisions 64 on its periphery, and at least one stationary support element 65 (also see FIG. 6) dividing each of said divisions 64 into an upper section 64a and a lower section 64b along a part of its rotation cycle. The upper sections 64a and the lower sections 64b of the divisions 64 are not in phase with one another and means are provided, such as, for example, inclined surfaces 67 for leading the articles 20 from the upper sections 64a to the lower sections 64b of the divisions 64 when they fall due to gravity through a cutout 66 of said stationary support element 65.

The transfer wheel 63 is arranged in relation to the moving structure 7 and kinematically linked thereto such that the upper sections 64a of the divisions 64 are in phase with the alignment conduits 3 and the lower sections 64b of the divisions 64 are in phase with the compartments 4. Therefore, the upper sections 64a of the divisions 64 receive the articles 20 deflected by said outfeed deflector 61 from said upper sections 3a of the alignment conduits 3. In the course of the alternative circuit defined by the transfer wheel 63, the articles 20 fall due to gravity from the upper sections 64a to the lower sections 64b of the divisions 64 through said cutout 66 of the stationary support element 65, and then the articles 20 are delivered from the lower sections 64b of the divisions 64 to the compartments 4 by means of said infeed deflector 62. The articles 20 slide over a stationary support plane 68 and are guided by an outer casing or railing means 69 along the length of the alternative circuit defined by the transfer wheel 63.

According to a variant, not shown, of the embodiment of the transfer means 60 of FIG. 3, the transfer wheel 63 comprises an upper portion and a lower portion coaxially arranged and actuated to rotate at different speeds. Upper sections 64a of the divisions 64 are arranged in the periphery of the upper portion and lower sections 64b of the divisions 64 are arranged in the lower portion. The different speeds of the upper and lower portions are coordinated with one another and with the rotating speed of the moving structure 7 so that the upper sections 64a are in phase with the alignment conduits 3, the upper and lower sections 64a, 64b are mutually aligned when passing through a cutout of a stationary support element positioned between both, and the lower sections 64b are in phase with the compartments 4.

Figure 7:
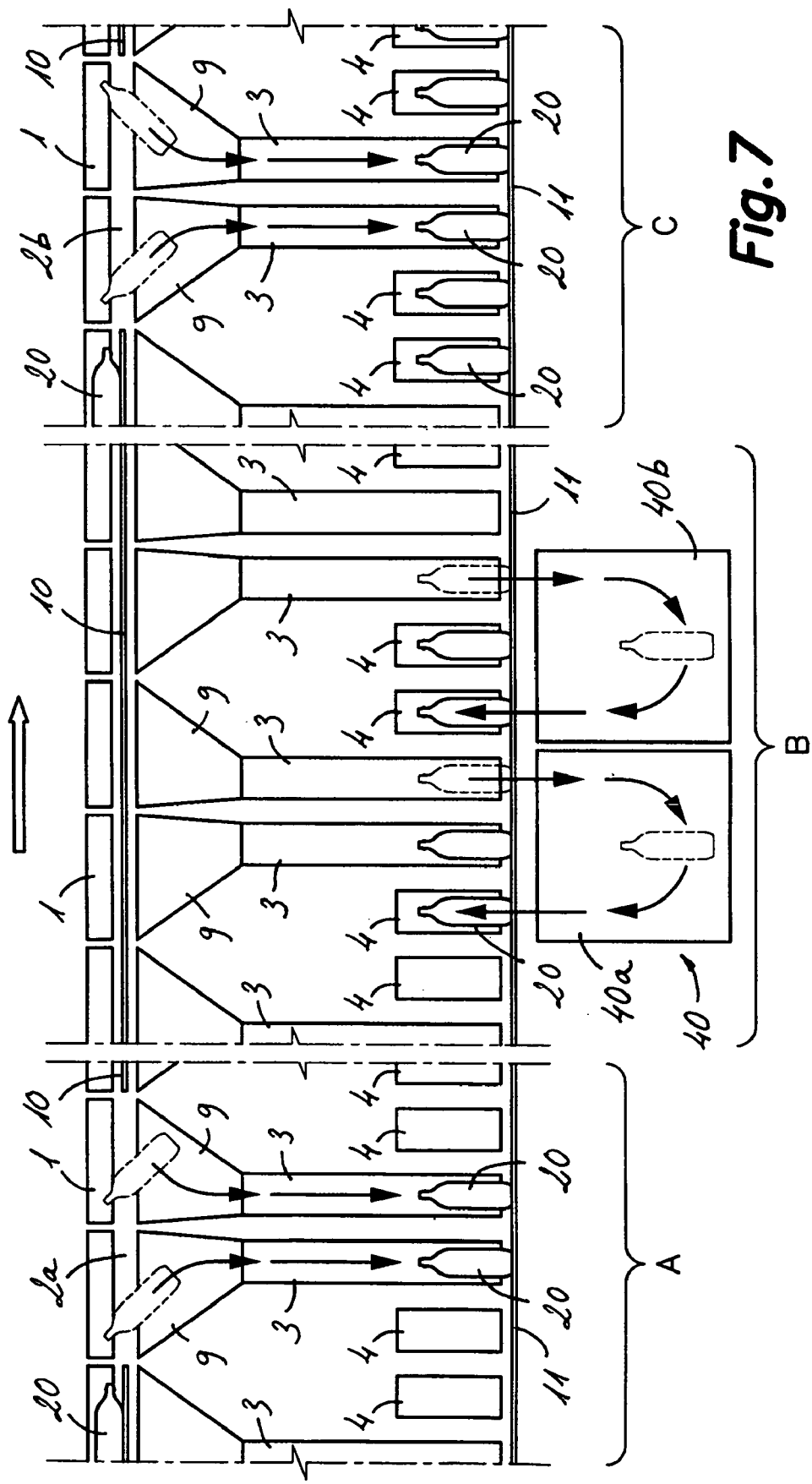
FIG. 7 is a schematic diagram representing a linear development of an apparatus with a cyclical arrangement of housings, alignment conduits and compartments according to yet another embodiment of the present invention, including areas A, B, C showing different steps in the course of a cycle according to another embodiment of the method of the present invention.

FIG. 7 shows yet another embodiment in which the drop conduits 3 are grouped in pairs and there are two compartments 4 arranged between each pair of drop conduits 3. Articles 20 are loaded into the two drop conduits 3 of each pair through the first drop site 2a (area A of FIG. 7). Then (area B of FIG. 7) a first device 40a of transfer means 40 transfers the articles 20 from the front alignment conduits 3 of each pair to the front compartments 4 of each pair, and a second device 40b of said transfer means 40 transfers the articles 20 from the rear alignment conduits 3 of each pair to the rear compartments 4 of each pair. Finally (area C of FIG. 7), articles 20 are loaded in both alignment conduits 3 of each pair through the second drop site 2b, such conduits having been previously emptied by virtue of the transfer carried out by the transfer means 40. From this point on, both the alignment conduits 3 and the compartments 4 are occupied by articles 20 which are ready to be unloaded onto an outfeed conveyor.

With this embodiment, later drop sites could be arranged in the same cycle, positioning later pairs of compartments and later pairs of devices of the transfer means. Alternatively, the alignment conduits could be divided into an upper section and a lower section by a stationary support element, in a manner similar to that described in relation to FIG. 3, in which case each device of the transfer means could be similar to the one described in relation to FIGS. 4 and 6.

In relation to the FIGS. 1 and 3, a method for positioning articles by means of an apparatus comprising multiple unloading operations per cycle, according to the present invention, is also described below. The method is of the type comprising the steps of placing the articles 20 in a plurality of individual housings 1 that move along the length of a closed circuit provided with at least first and second drop sites 2a, 2b, the correctly oriented articles 20 falling through said first and second drop sites 2a, 2b from each housing 1 into a corresponding alignment conduit 3 placed under and moving together with each housing 1, and extracting the correctly oriented and aligned articles 20 from said alignment conduits 3 to an outfeed conveyor.

The method of the present invention is characterized in that it comprises providing a plurality of compartments 4 positioned between the alignment conduits 3, and the additional step of transferring each article 20 from its corresponding alignment conduit 3 to one of said compartments 4 after said particular article 20 has been received in the corresponding alignment conduit 3 through said first drop site 2a and before the alignment conduit 3 receives a new article 20 through said second drop site 2b.

According to one embodiment of the method shown in FIG. 1, the mentioned additional step of transferring each article 20 from its corresponding alignment conduit 3 to one of said compartments 4 comprises deflecting the articles 20 by means of an outfeed deflector 41 from their corresponding alignment conduits 3 to a translation device, transferring the articles 20 along the length of an alternative circuit by means of said translation device, and transferring the articles 20 from said translation device to their corresponding compartments 4 by means of an infeed deflector 42. The mentioned step of transferring the articles 20 along said alternative circuit comprises transferring the articles 20 from said outfeed deflector 41 to said infeed deflector 42 by means of an odd number of rotating transfer wheels 43, 44, 45 provided with divisions 46, 47, 48 on their periphery, each one suitable for housing an article 20, and tangentially coupled consecutively for transferring the articles 20 from the mentioned divisions 46 of each of the transfer wheels 43, 44, 45 to the divisions 46, 47, 48 of the next one.

According to another embodiment of the method shown in FIG. 3, the method comprises providing at least one stationary support element 5 dividing each of the alignment conduits 3 into an upper section 3a and a lower section 3b along a part of said closed circuit including an area corresponding to said first drop site 2a and not including an area corresponding to said second drop site 2b, and arranging said compartments 4 at the level of said lower sections 3b of the alignment conduits 3. In this embodiment, the mentioned additional step of transferring each article 20 from its corresponding alignment conduit 3 to one of said compartments 4 comprises deflecting the articles 20 by means of an outfeed deflector 61 from said upper sections 3a of the corresponding alignment conduits 3 to a translation device, transferring the articles 20 along the length of an alternative circuit by means of said translation device, and transferring the articles 20 from said translation device to their corresponding compartments 4 by means of an infeed deflector 42. The mentioned step of transferring the articles 20 along said alternative circuit comprises transferring the articles 20 by means of said outfeed deflector 61 from the upper sections 3a of the alignment conduits 3 to upper sections 64a of divisions 64 provided in the periphery of a rotating transfer wheel 63, the articles 20 falling from said upper sections 64a to lower sections 64b of said divisions 64 through a cutout 66 provided in at least one stationary support element 65, and delivering the articles 20 from said lower sections 64b of the divisions 64 to the compartments 4 by means of said infeed deflector 62.

A person skilled in the art will know to apply modifications to the embodiments shown and described without departing from the scope of the present invention as it is described in the attached claims.

The invention claimed is:

1. An apparatus for positioning articles, comprising multiple unloading operations per cycle, the apparatus comprising:
    means for moving a plurality of housings and a plurality of alignment conduits along a length of a closed circuit, with each alignment conduit being placed under one of said housings;
    means for placing articles in said plurality of housings, said articles having a symmetry that provide for only one of two vertical orientations;
    at least first and second drop sites provided in said closed circuit, wherein said articles fall from each housing into the corresponding alignment conduit through said first and second drop sites, each housing being configured to confer one of said two vertical orientations to the article when falling;
    extraction means for extracting the vertically oriented articles from said alignment conduits to an outfeed conveyor where the articles are positioned in said one of two vertical orientations and aligned;
    a plurality of compartments positioned between said alignment conduits; and
    transfer means for transferring each article from its corresponding alignment conduit to one of said compartments after said particular article has been received in the corresponding alignment conduit through said first drop site, leaving said alignment conduit unoccupied so that it can receive a new article through said second drop site.

2. An apparatus according to claim 1, wherein it comprises one or more compartments positioned between individual alignment conduits.

3. An apparatus according to claim 1, wherein it comprises one or more pairs of compartments positioned between pairs of alignment conduits.

4. An apparatus according to claim 1, wherein said transfer means comprises:
    an outfeed deflector arranged for transferring the articles from their corresponding alignment conduits to a translation device for transferring the articles along the length of an alternative circuit, and
    an infeed deflector arranged for transferring the articles from said translation device to their corresponding compartments.

5. An apparatus according to claim 4, wherein said translation device comprises:
    an outfeed transfer wheel rotatably arranged to receive in divisions of its periphery the articles deflected by said outfeed deflector from the alignment conduits,
    an infeed transfer wheel rotatably arranged to deliver the articles from divisions of its periphery to said compartments by means of said infeed deflector, and
    at least one rotating intermediate transfer wheel provided with divisions on its periphery and tangentially connected with the outfeed and infeed transfer wheels to receive in its divisions the articles from the divisions of the outfeed transfer wheel and to deliver them to the divisions of the infeed transfer wheel.

6. An apparatus according to claim 5, wherein it comprises an odd number of said rotating intermediate transfer wheels provided with divisions on their periphery, said intermediate transfer wheels being tangentially coupled consecutively for transferring the articles from the mentioned divisions of each one to the divisions of the next one.

7. An apparatus according to claim 5, wherein said outfeed, intermediate and infeed transfer wheels are kinematically linked to one another and with a moving structure on which the housings, the alignment conduits and the compartments are assembled such that the divisions of the outfeed and infeed transfer wheels are respectively in phase with the alignment conduits and the compartments.

8. An apparatus according to claim 7, wherein at least the alignment conduits and the compartments are equipped with adaptation means for adapting them to different sized articles, and in that each of said transfer wheels comprises on its periphery a series of first divisions suitable for articles of a first size, and a series of second divisions suitable for articles of a second size positioned between the first ones, adjustment means being arranged for adjusting the angular positions of the transfer wheels to selectively put the first or second divisions of the outfeed and infeed transfer wheels respectively in phase with the alignment conduits and the compartments.

9. An apparatus according to claim 4, further comprising at least one stationary support element dividing each of the alignment conduits into an upper section and a lower section along a part of said closed circuit including an area corresponding to said first drop site and not including an area corresponding to said second drop site, said compartments being arranged at the level of said lower sections of the alignment conduits.

10. An apparatus according to claim 9, wherein said translation device comprises a rotating transfer wheel comprising divisions on its periphery, and at least one stationary support element dividing each of said divisions into an upper section and a lower section along a part of its rotation cycle, said transfer wheel being arranged to receive in said upper sections of its divisions the articles deflected by said outfeed deflector from said upper sections of the alignment conduits, the articles falling from the upper sections to said lower sections of the divisions through a cutout of said stationary support element, and delivering the articles from the lower sections of the divisions to the compartments by means of said infeed deflector.

11. An apparatus according to claim 10, wherein the upper sections and the lower sections of the divisions are not in phase with one another, and said transfer wheel is kinematically linked with a moving structure on which the housings, the alignment conduits and the compartments are assembled such that the upper sections of the divisions are in phase with the alignment conduits and the lower sections of the divisions are in phase with the compartments.

12. An apparatus according to claim 6, wherein said outfeed, intermediate and infeed transfer wheels are kinematically linked to one another and with a moving structure on which the housings, the alignment conduits and the compartments are assembled such that the divisions of the outfeed and infeed transfer wheels are respectively in phase with the alignment conduits and the compartments.

* * * * *